April 20, 1954  R. O. GREENSHIELDS ET AL  2,675,848
RIM-ROLLING MACHINE

Filed Feb. 21, 1952  11 Sheets-Sheet 1

INVENTORS
Robert O. Greenshields.
John G. Kay.
BY  Maurice A. Crews
ATTORNEY

April 20, 1954  R. O. GREENSHIELDS ET AL  2,675,848
RIM-ROLLING MACHINE
Filed Feb. 21, 1952  11 Sheets-Sheet 2

INVENTORS
Robert O. Greenshields
John G. Kay
BY
Maurice A. Crews
ATTORNEY

April 20, 1954  R. O. GREENSHIELDS ET AL  2,675,848
RIM-ROLLING MACHINE
Filed Feb. 21, 1952  11 Sheets-Sheet 7

INVENTORS.
Robert O. Greenshields
BY  John G. Kay.
Maurice A. Crews
ATTORNEY

April 20, 1954   R. O. GREENSHIELDS ET AL   2,675,848
RIM-ROLLING MACHINE
Filed Feb. 21, 1952   11 Sheets-Sheet 9

INVENTORS.
Robert O. Greenshields
John G. Kay.
BY
*Maurice A. Crewl*
ATTORNEY

April 20, 1954   R. O. GREENSHIELDS ET AL   2,675,848
RIM-ROLLING MACHINE

Filed Feb. 21, 1952   11 Sheets-Sheet 10

INVENTORS.
Robert O. Greenshields
John G. Kay.
BY
Maurice A. Crews
ATTORNEY

April 20, 1954  R. O. GREENSHIELDS ET AL  2,675,848
RIM-ROLLING MACHINE
Filed Feb. 21, 1952  11 Sheets-Sheet 11
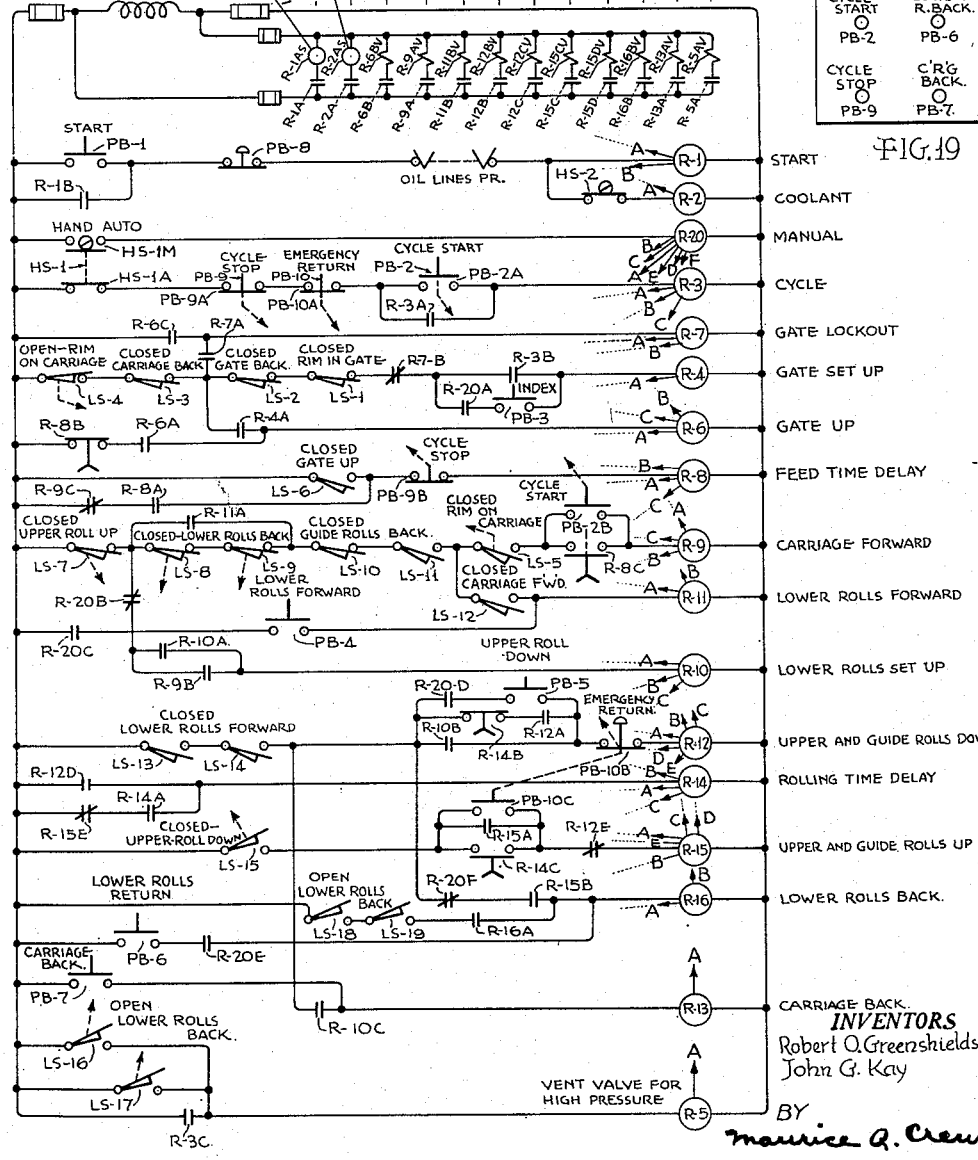

Patented Apr. 20, 1954

2,675,848

UNITED STATES PATENT OFFICE 2,675,848

RIM-ROLLING MACHINE

Robert O. Greenshields and John G. Kay, Detroit, Mich., assignors to The Budd Company, Philadelphia, Pa., a corporation of Pennsylvania Application February 21, 1952, Serial No. 272,816

13 Claims. (Cl. 153—28)

This invention relates to a rim rolling machine and has for an object the provision of improvements in this art.

In making rims, as for example, drop-center rims for automobiles, it has been found that for the fastest and most accurate size-maintained production, the rims are formed by a judicious combination of press-forming and roll-forming operations. If rolls alone are used, especially if a single rolling machine is used to form a finished rim from rim blanks in the flat, it is very difficult, indeed practically impossible, to produce rims accurately to desired size and shape. This is especially the case when the rolls become worn—and they wear very rapidly when they are required to do so much work in one operation. Die forming operations alone are not sufficient, the repeated action of forming rolls seeming to be necessary to establish the final size and shape with accuracy without permitting spring-back.

The present invention is based upon the finding that if the rim is preliminarily formed to a close approximation to the desired final shape, as by press forming operations or a combination of press and roll operations, the final rolling operation can be performed very rapidly and will produce rims of great accuracy.

It is, therefore, a particular object of the present invention to provide a rim rolling machine which will operate very rapidly and produce finished rims of great accuracy in size and shape.

Another object of the invention is to provide rolls which initially assume their final positions relative to the axis of the rim so as to avoid axial movement during the rolling action.

Another object is to establish great rigidity in the operative positional relationship of rolls which are at other times separated axially to permit insertion and removal of the workpieces— rim blanks and finished rims.

Another object is to provide improved means for feeding rim blanks to the rolls.

Another object is to provide safe inter-related action between the various parts of the machine to assure, for example, that a rim blank is not fed in to rolling position unless all working rolls are in retracted position; that the rolls which are separable endwise are full brought together before the cooperating roll is brought into operating position; that the rim blank feeding carriage does not retract until the endwise-separable rolls are fully brought together; that the carriage is brought fully back into blank-receiving position before a blank can be fed upon it; that a rim blank cannot be fed to the carriage unless all the rolls are in retracted position; and that ample time is provided for a rim to be fed in upon the carriage and for the rolls to perform their full rolling action before subsequent actions can occur.

The above and other objects of the invention will be apparent from the following description of an exemplary embodiment, reference being made to the accompanying drawings thereof, wherein:

Fig. 12 is a horizontal section taken on the line 12—12 of Fig. 5;

Fig. 13 is an inclined section taken on the line 13—13 of Fig. 7;

Fig. 14 is an enlarged vertical section taken on the line 14—14 of Fig. 8;

Fig. 15 is an enlarged vertical section taken on the line 15—15 of Fig. 8;

Fig. 16 is a side elevation of parts shown in Fig. 15;

Fig. 18 is a wiring diagram;

Fig. 19 is a face view of a control panel.

Figure 1:
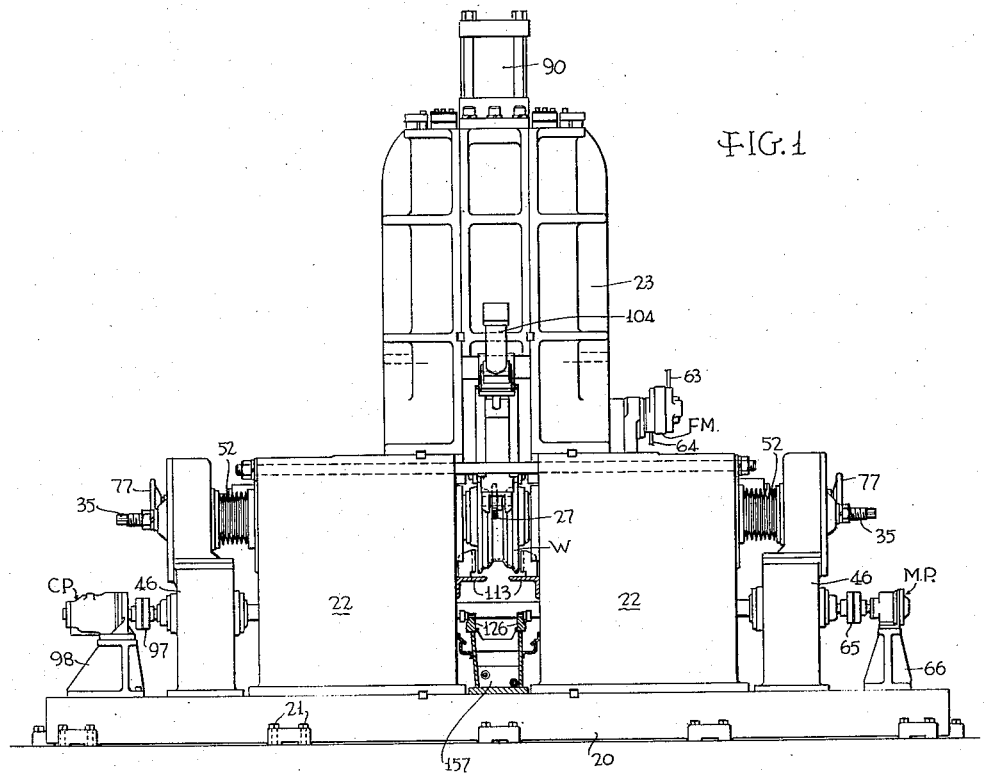
Fig. 1 is a front elevation, partly in section, of a rim rolling machine embodying the invention.

The machine, as stated, is designed to perform the final rolling operation on a drop-center rim and receives rim blanks in a shape which fairly closely approximates the final shape, but which require a small amount of sizing and shaping to bring them very accurately to final dimensions and prevent spring-back.

The machine comprises lower or end rolls which operate on the inside of the rim and which move back and forth axially to permit a rim to be fed in upon them and to be removed from them. A lateral or side roll, here located above the separable end rolls, moves against the rim after the end rolls have come together and with the end rolls turns the rim to final shape. Guide rolls come in laterally on each side of the top roll to prevent the rim from whipping back and forth in its own plane during rolling and, thus, make the rolling action smoother and prevent the formation of waves in the rim. The end rolls are driven together at all times, and the top roll is driven by means which permits it to turn at the speed required by the lower or end rolls to avoid slippage and prevent breakage of parts.

Rims are fed in by improved means to the rolls and, after being rolled, they drop out and roll away by gravity. Means are also provided for causing the feeding and rolling operations to be performed automatically and with maximum speed and safety.

With this general understanding of the purposes and organization of the machine, the particular embodiment of the invention which is illustrated in the drawings will now be described.

The machine comprises a substantial base 20 which rests upon a fixed foundation, such as the floor, and which may be anchored thereto, as by bolts 21. Upon the base there is secured the main roll frame comprising two axially spaced pedestals 22, 22 and a surmounting stand 23 which is carried upon the spaced pedestals so as to form a strong structural connection therebetween.

The pedestals 22 (Figs. 5 to 8) carry the axially movable lower rolls 25, 25 and associated mechanisms and the stand 23 carries the upper roll 26, the guide rolls 27, and associated mechanisms. The rim blanks and finished rims, which will generally be referred to as workpieces or stock, are designated by the letter W.

Figure 11:
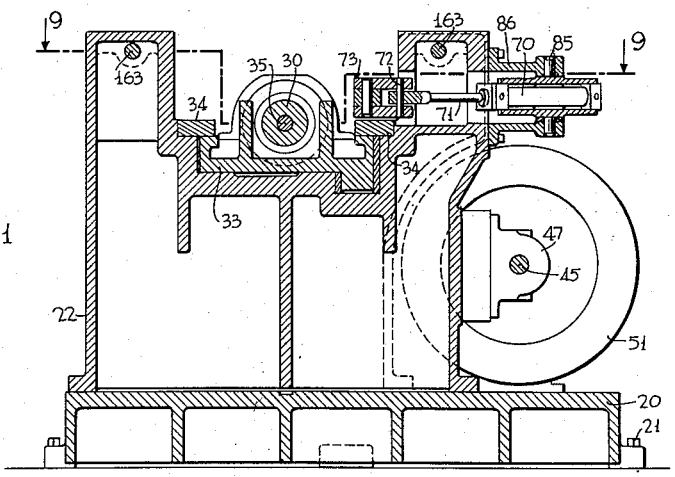
Fig. 11 is a transverse vertical section taken on the line 11—11 of Fig. 9.

The lower rolls 25 are mounted on strong shafts 30, each carried in spaced bearings 31, 32 provided on a rigid slide 33 which, as best shown in Figs. 11 and 12, slides on ways provided on the pedestals 22. The ways are lined where needed, and the slides are retained by any suitable means, such as the bars 34 which are bolted to the frame.

The lower rolls 25 are mounted on their shafts 30 so as to be quickly replaceable. In the construction illustrated, the rolls are socketed on the ends of the shafts and are retained by long clamping bolts 35 which pass through the rolls and shafts. The bolts 35 have heads and quick-disconnect means at their inner ends housed within end bores in the rolls and have nuts 36 threaded on their outer ends so as to be loosened or removed to change the rolls. The nuts tighten against the reduced end portions of the shafts 30.

The rolls 25 move axially until they come together and, in effect, form a single roll unit before any rolling is done. The rolls at their inner ends interfit with each other, one of the rolls, for example, having bolted within its end cavity a strong cup-shaped member 37 which telescopes within and closely fits the cylindrical cavity or end bore of the companion roll. The bridging connection thus formed by the rolls and their massive shafts is so strong that great lateral loads may be brought upon the lower rolls, as by the upper roll, without any appreciable side yield. Very heavy rolling pressures can, therefore, be used with correspondingly great accuracy in shaped dimensions.

Figure 2:
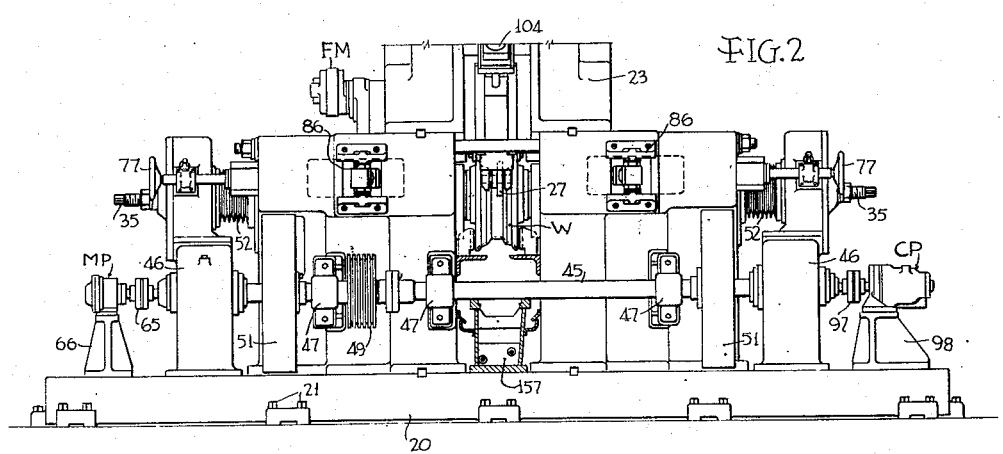
Fig. 2 is a rear elevation, partly in section and with the upper part cut away, of the machine.
Figure 4:
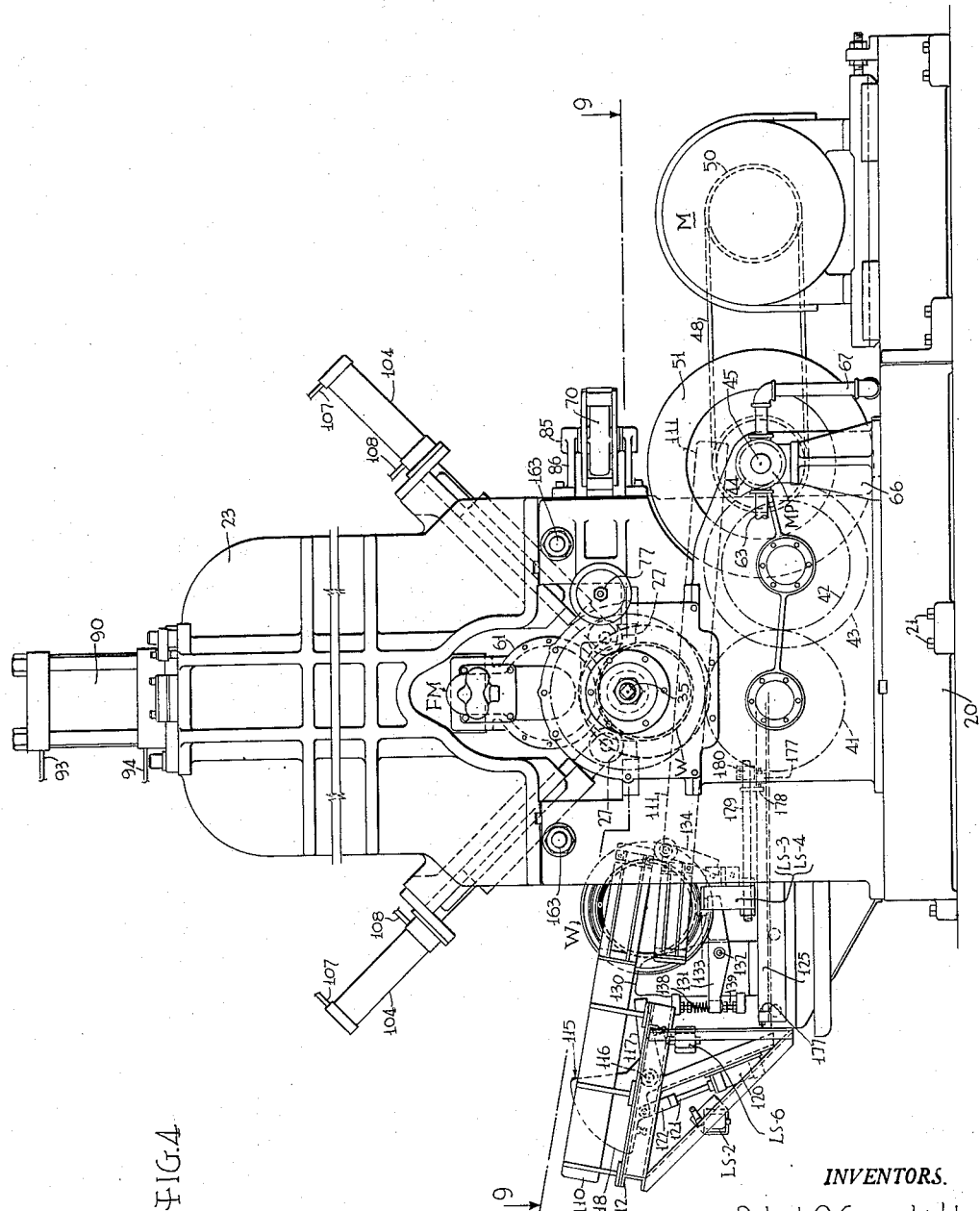
Fig. 4 is a right end elevation taken on the line 4—4 of Fig. 3.

For their drive in all positions of the slides on which they are mounted, the roll shafts 30 are splined on their reduced ends, as at 30a so as to slide axially in correspondingly splined hub bores of drive gears 40. Each gear 40 on a shaft 30 (Fig. 4) is driven by a train of gears 41, 42, 43 and 44 from a common shaft 45 extending approximately the full length of the machine. The gear train and shaft at each end are mounted in a housing 46 secured on the base 20. As shown in Fig. 2, other bearings 47, secured to the frame pedestals, support the shaft 45 between its ends. The shaft 45 is driven by an electric motor M, as through multiple belts 48 and suitable pulleys 49 and 50 on the shaft 45 and motor shaft, respectively. Inertia flywheels 51 are mounted at spaced points on shaft 45. The splined portions 30a of shafts 30, which would otherwise be exposed between the slides 33 and the fixed housings 46, are protected by surrounded accordion sleeves 52.

Figure 5:
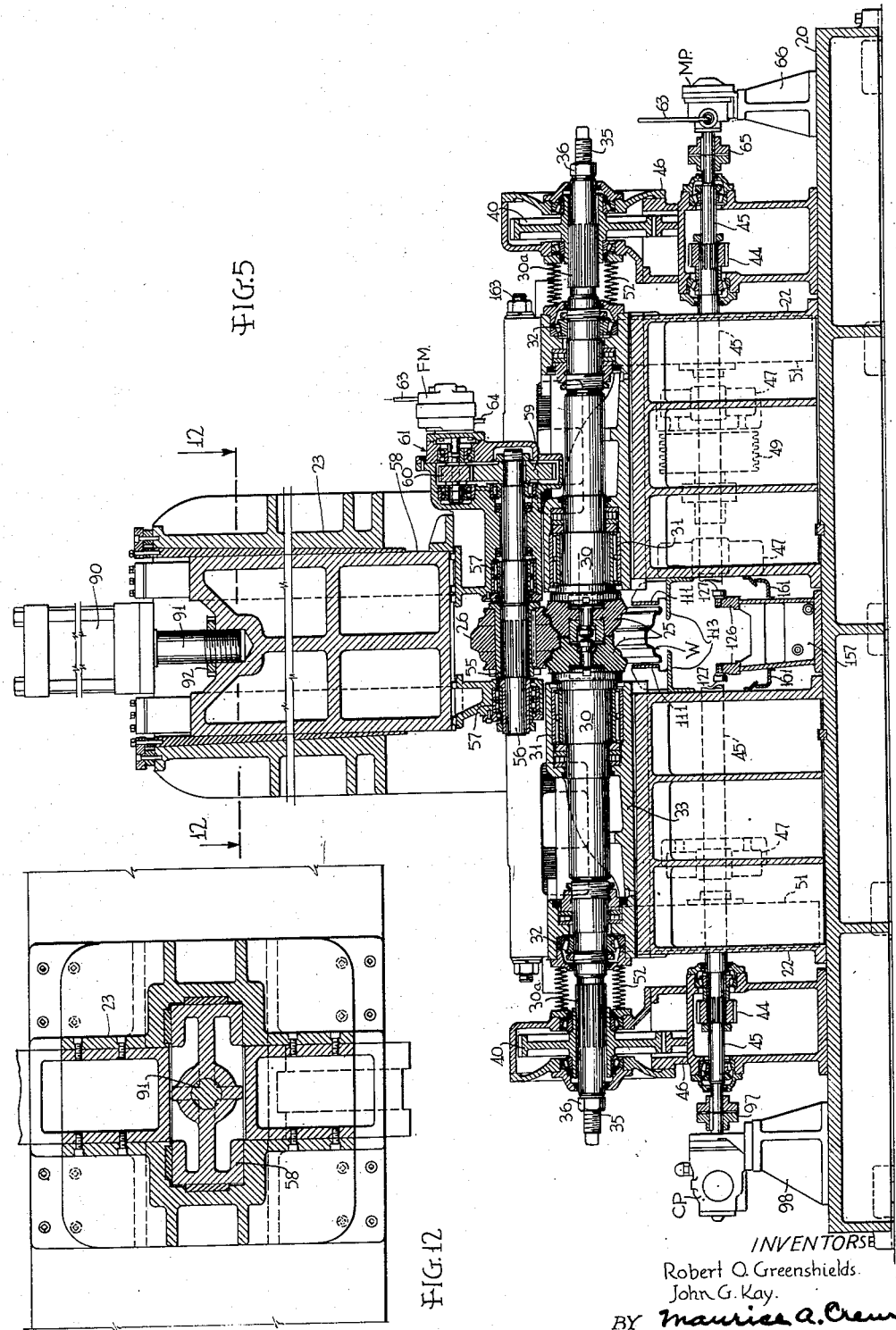
Fig. 5 is an axial vertical section taken on the line 5—5 of Fig. 3.

The upper roll 26, as shown in Fig. 5, is mounted on a sleeve 55 which is splined for some end play on a shaft 56 so as to follow the lower rolls in case they have any axial movement during rolling. The shaft 56 is mounted in spaced bearings 57 carried on the lower end of a slide head 58 which is mounted in suitable ways in the stand 23.

The upper roll shaft 56 is driven from a suitable source of power, as a fluid (liquid) motor FM, as through gears 59 and 60. The motor FM and the gear train are here shown as being carried by a housing 61 secured to the head 58. The drive is such as to permit the upper roll 26 to move at the speed required by the lower rolls, which provide the principal driving power, without appreciable slippage and without danger of breaking the driving elements.

Figure 3:
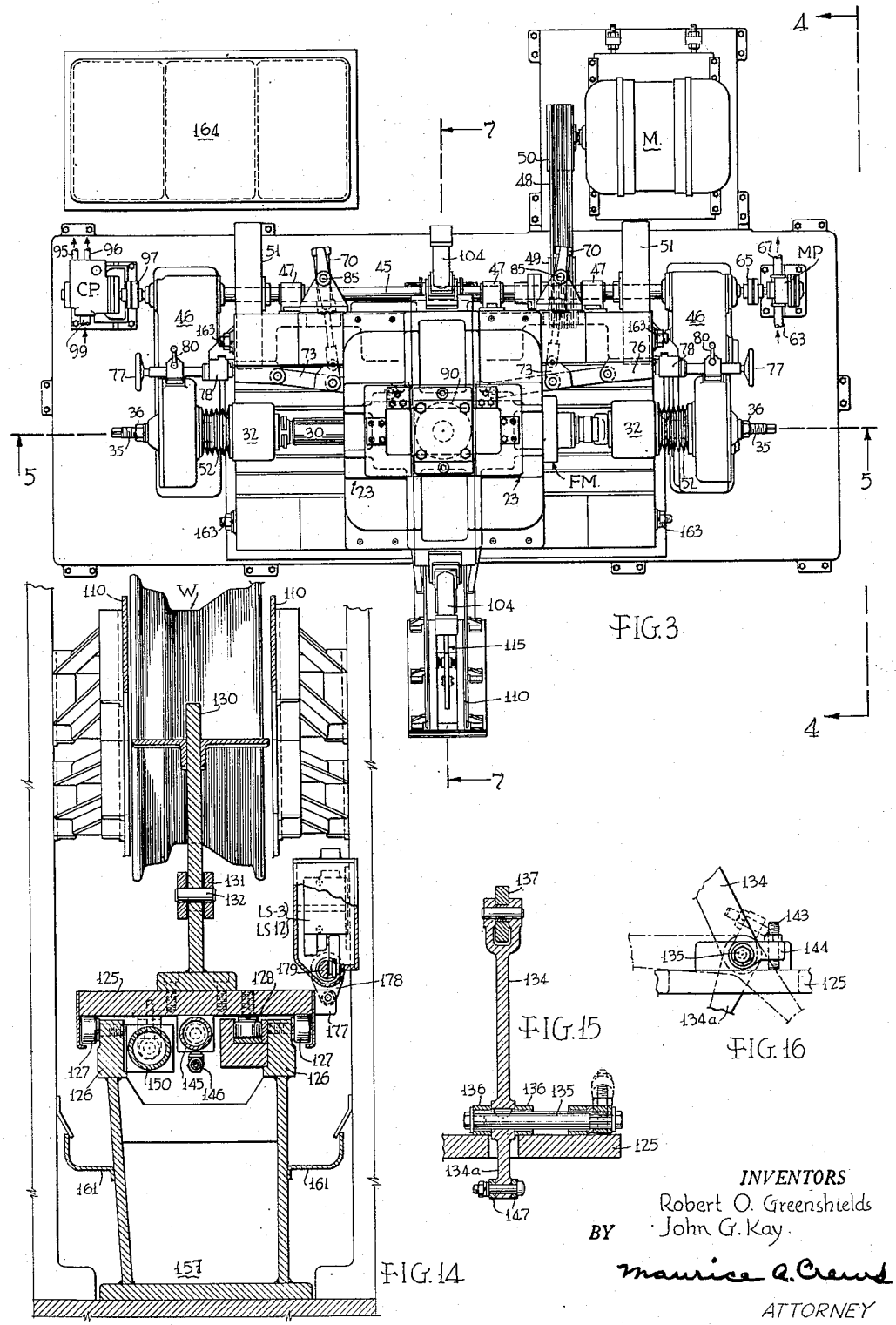
Fig. 3 is a top plan view.

Fluid under pressure for driving the motor FM may be supplied through a flexible hose line 63 and may be returned to a reservoir or sump through a flexible hose 64. The pressure fluid is supplied to motor FM by a pump MP driven by the shaft 45 through a flexible coupling 65, the pump being mounted on a small pedestal 66. Fluid passes to the pump from a sump or reservoir by way of a pipe line 67 (Fig. 3). The line 63 is provided with a flow control valve 68 and a pressure relief valve 69.

Figure 9:
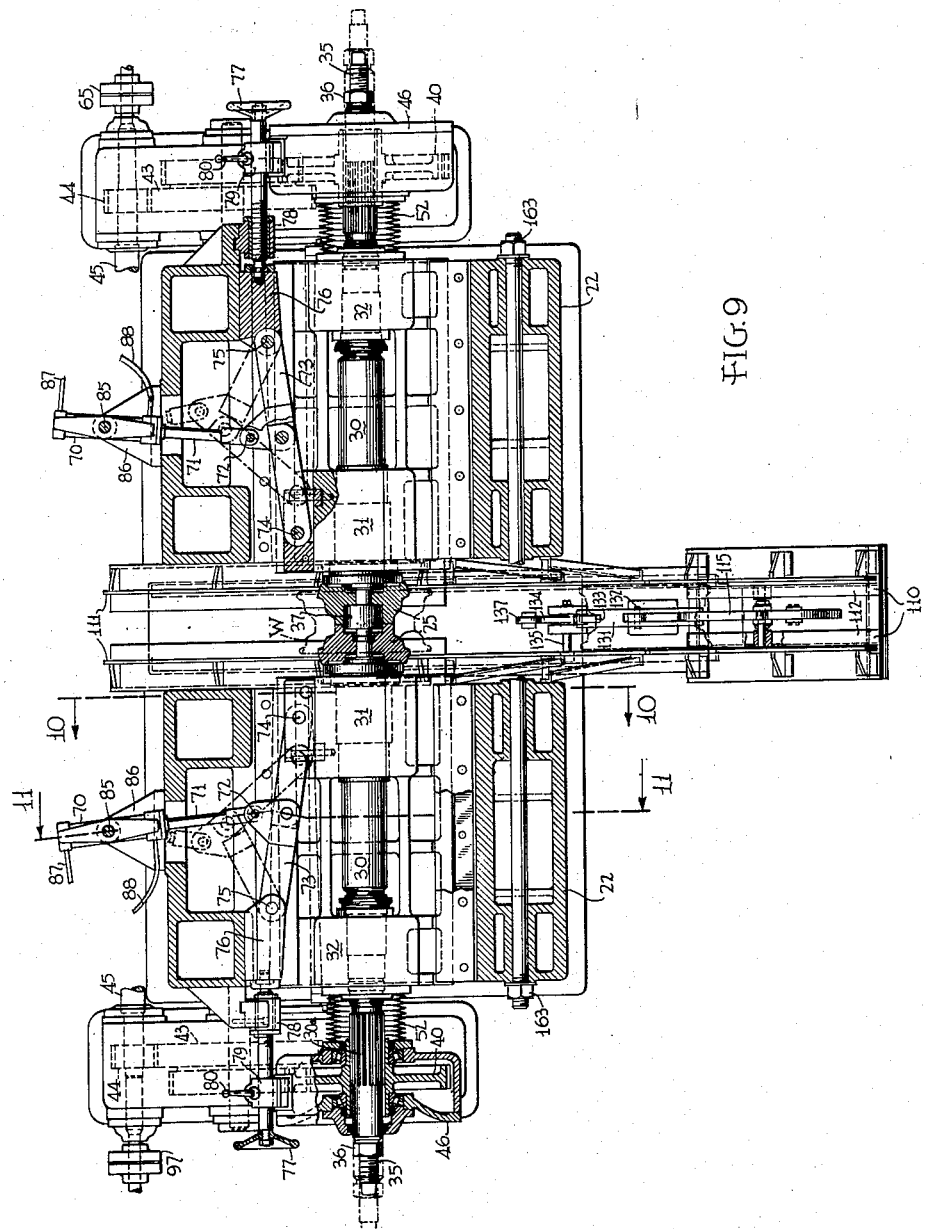
Fig. 9 is a horizontal section taken about on the line 9—9 of Figs. 4 and 11.
Figure 10:
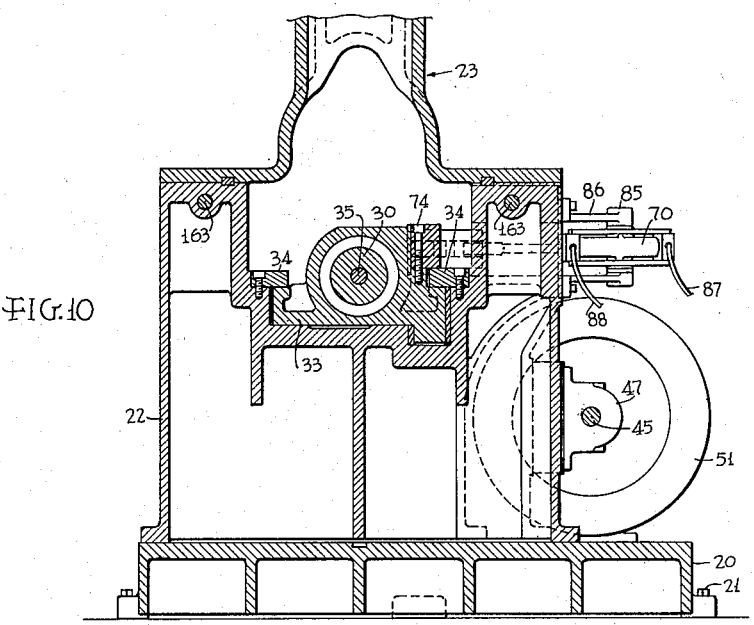
Fig. 10 is a transverse vertical section taken on the line 10—10 of Fig. 9.

The rolls 25 are moved axially between retracted and advanced positions, as by fluid actuated devices (Figs. 9 and 11), each including a cylinder 70 and a piston therein having a piston rod 71 extending therefrom and connected by a pin 72 to link toggle mechanism, generally designated by the numeral 73. The toggle mechanism is connected at one end, as by a pin 74, to the roll slide 33 and connected at its other end, as by a pin 75, to an adjustable slide 76 mounted in guides on a pedestal. The slide 76 is adjusted by a hand screw 77 threaded in a fixed bracket 78 and turnable in a split sleeve bracket 79. It may be locked in position as by a clamp screw 80. This adjustment provides for stopping the rolls at different places in their advanced position and assures that they will always be brought tightly together before rolling begins.

Each cylinder 70 is mounted by a pivot 85 in fixed brackets 86 so its piston rod is free to follow the movements required by the toggle mechanism, Fluid is supplied and exhausted at each end of each cylinder 70 by flexible hose lines 87 (head end) and 88 (rod or tail end).

The slide 58 of the upper roll 26 is moved between retracted and advanced positions, as by a fluid actuated device (Fig. 8), including a fixed cylinder 90 and a piston therein having a piston rod 91 connected to the upper end of the slide. The piston rod may be threaded into the slide and made fast by a locknut 92 (Fig. 5).

Fluid is supplied and exhausted at each end of the cylinder 90, as by flexible hose lines 93 (head end) and 94 (rod or tail end).

Fluid under pressure for operating the devices 70 and 90 may be supplied through flexible hose lines 95 and 96 from a combination pump CP driven by the shaft 45 through a flexible coupling 97, the pump being mounted on a small pedestal 98. Fluid passes to the pump from a sump or reservoir by way of a pipe line 99 (Fig. 3).

Suitable valve means and valve operating means are provided for controlling the action of the fluid actuated means which move the rolls 25 and 26 between advanced and retracted positions. These control means will be described presently; but, first, attention will be directed to the guide rolls 27 and the rim feeding means.

Figure 7:
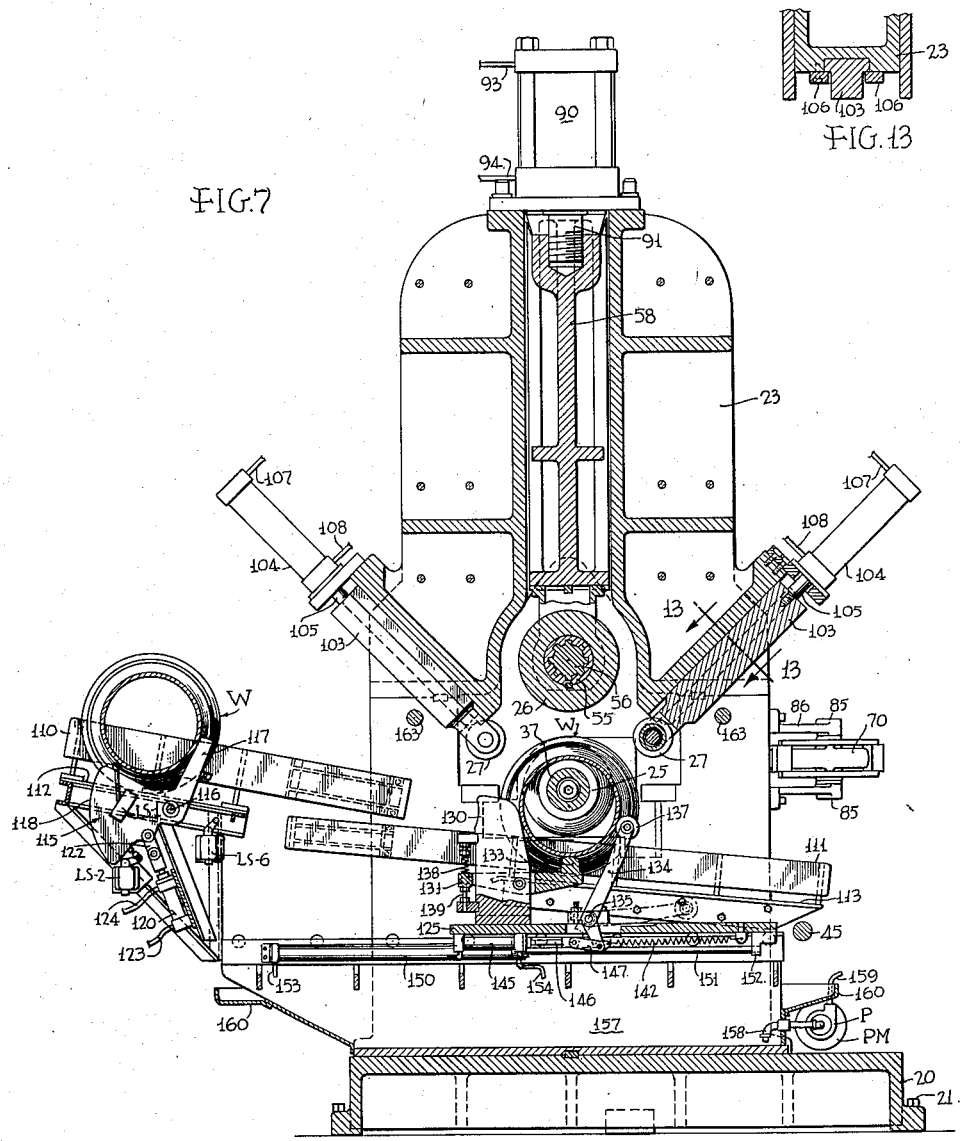
Fig. 7 is a transverse vertical section taken on the line 7—7 of Fig. 3.

The guide rolls 27, Fig. 7, are advanced and retracted in time with the upper roll 26 and might be mounted to move with it, but for convenience of assembly and operation they are mounted on slides 103 movable in ways provided on the head frame 23. The slides are operated by fluid power devices, each including a cylinder 104 and a piston therein having a rod 105 connected to the slide 103. The slides are retained on their ways, as by guide bars 106. Fluid is supplied to and exhausted from the cylinders 104 by way of flexible hose lines 107 (head end) and 108 (rod or tail end). Preferably, compressed air is used here, the power requirements not being as great as for the working rolls and some resilience being desirable.

The rim feeding means is designed to convey rims by gravity under automatic control along a central vertical plane from a supply chute, through the machine between the frame pedestals, into the rolling space when the lower rolls are separated, and out of the machine along a discharge chute when the lower rolls are separated.

The specific feeding means shown herein comprises certain feeding means which cooperate with the gravity feed chute 110 and the gravity discharge chute 111. As shown in Figs. 5, 6, 7 and 8, the supply chute 110 includes axially spaced track rails 112, and the discharge chute 111 includes axially spaced track rails 113 along which the rims roll.

Figure 8:
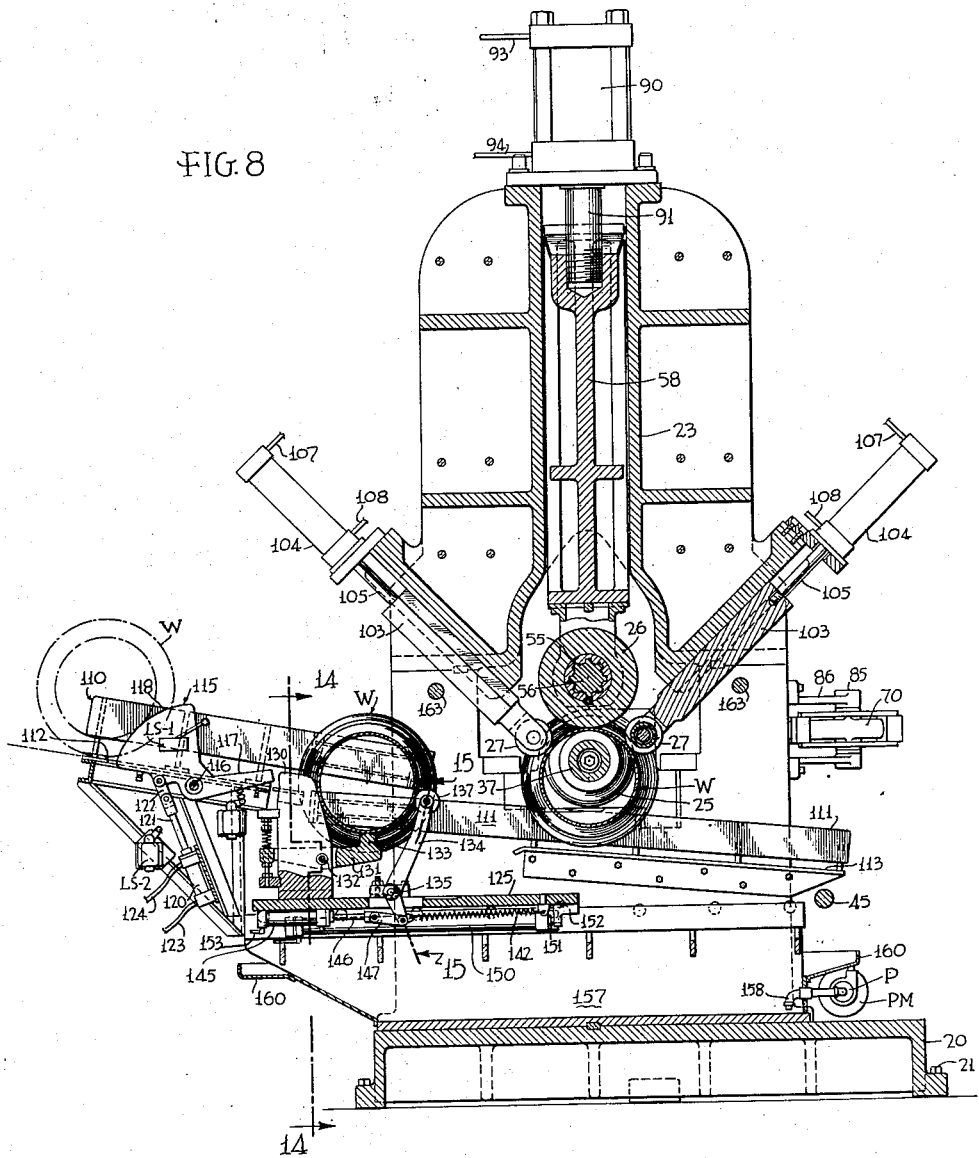
Fig. 8 is a transverse vertical section, similar to Fig. 7 but showing the parts in different positions.

As shown particularly in Figs. 7 and 8, the feeding means includes a gate or escapement control mechanism associated with the supply chute and a shuttle conveyor for positively transferring rims from the gate to the rolling position.

The escapement mechanism or gate includes a dispensing device or gate proper 115 which is mounted to oscillate about a fixed pivot 116 and which includes an arm 117 and an arcuate segment 118 spaced angularly from the arm 117 to form an angular pocket to receive a rim W. The arcuate peripheral portion of the segment 118 is adapted to hold back the next succeeding rim in the line of rims rolling down the extended supply chute (indicated only by broken lines) to hold it up until the rim in the gate has been discharged to the transfer mechanism and the gate has turned back to its rearward position to receive another rim blank.

The gate 116 is operated by means, such as fluid (air) power means, including a cylinder 120 within which operates a piston having a rod 121 connected by pivot pins and a link 122 to the gate. Operating fluid (air) is supplied to and exhausted from the cylinder 120, as by pipe lines 123 (head end) and 124 (rod end).

The conveyor or transfer means for moving the rim blanks from the gate to the rolls comprises a carriage 125 movable along ways 126, as upon supporting rollers 127. As shown in Fig. 14, the ways include a lined groove within which operates rollers 128 carried by the carriage to keep the carriage in proper lateral position on the ways.

The carriage 125 is provided with a fixed rim-holding pedestal 130, a lever 131 pivoted at 132 thereon and having a rim supporting projection 133, and a movable rim-holding arm 134 pivoted on a shaft 135 in bearing brackets 136 carried by the carriage. On its outer end the arm carries a roller 137 of non-abrasive material adapted to engage the rim.

The lever 131 is held up by a spring 138 against an adjustable stop 139, the spring serving to cushion the fall of a rim upon the carriage.

The arm 134 is held up by a spring 142 which also serves to cushion the fall of a rim upon the carriage, the spring being attached at one end to the carriage and at the other end to a short arm 134a integral with the arm 134. The movement of the arm in rim-engaging direction is limited by an adjustable stop 143 secured on a short arm 144 splined on the shaft 135 of the arm. The return of the arm to rim-engaging position is cushioned by a dashpot or check having a cylinder 145 and a piston therein, the rod 146 of which is connected by pivots and a link 147 to the short arm 134a of arm 134. Valve means are provided for the dashpot, as will be noted later, for permitting the arm 134 to move down rapidly but causing it to rise slowly. Besides aiding to cushion the fall of a rim on the carriage, the arm 134 is required to swing down in passing under a rim in the rolls when the carriage returns to the back or rim-receiving position, and the spring and dashpot also control this movement of the arm, permitting it to swing down and assuring that it is in fully raised position by the time another rim is dropped upon the carriage.

The carriage is moved back and forth, as by fluid motive means, here shown as comprising a fixed cylinder 150 having therein a piston, the rod 151 of which is connected to a bracket 152 secured to the carriage. Operating fluid (air) is supplied to and exhausted from the cylinder 150, as by pipe lines 153 (head end) and 154 (rod end).

Means are provided for supplying coolant to the rolls while working on the rims, the means herein illustrated (Fig. 7) comprising a motor-operated pump P which takes coolant, with lubricating properties, from a sump 157 by way of an intake pipe 158 and delivers it by way of a discharge pipe line 159 to the rolls. The sump 157 is disposed between the machine frame pedestals 22 beneath the rolls and has its longer dimension disposed across the machine beneath the tracks provided for the rims to roll upon. At the ends, as shown in Figs. 7 and 8, the sump 157 is provided with gutters 160, and at the sides, Figs. 5 and 6, is provided with gutters 161 for catching splashed coolant and directing it back into the sump.

It will be noted from Figs. 5, 6, 7 and 8 that the frame pedestals 22 are tied together to strongly resist the axial spreading effect of roll operation by tie bolts 163. In Fig. 3 a large pressure tank 164 for hydraulic fluid for the pumps MP and CP is shown.

The machine may be operated either manually or automatically, the normal intended operation being automatic with the following sequence of actions.

Figure 6:
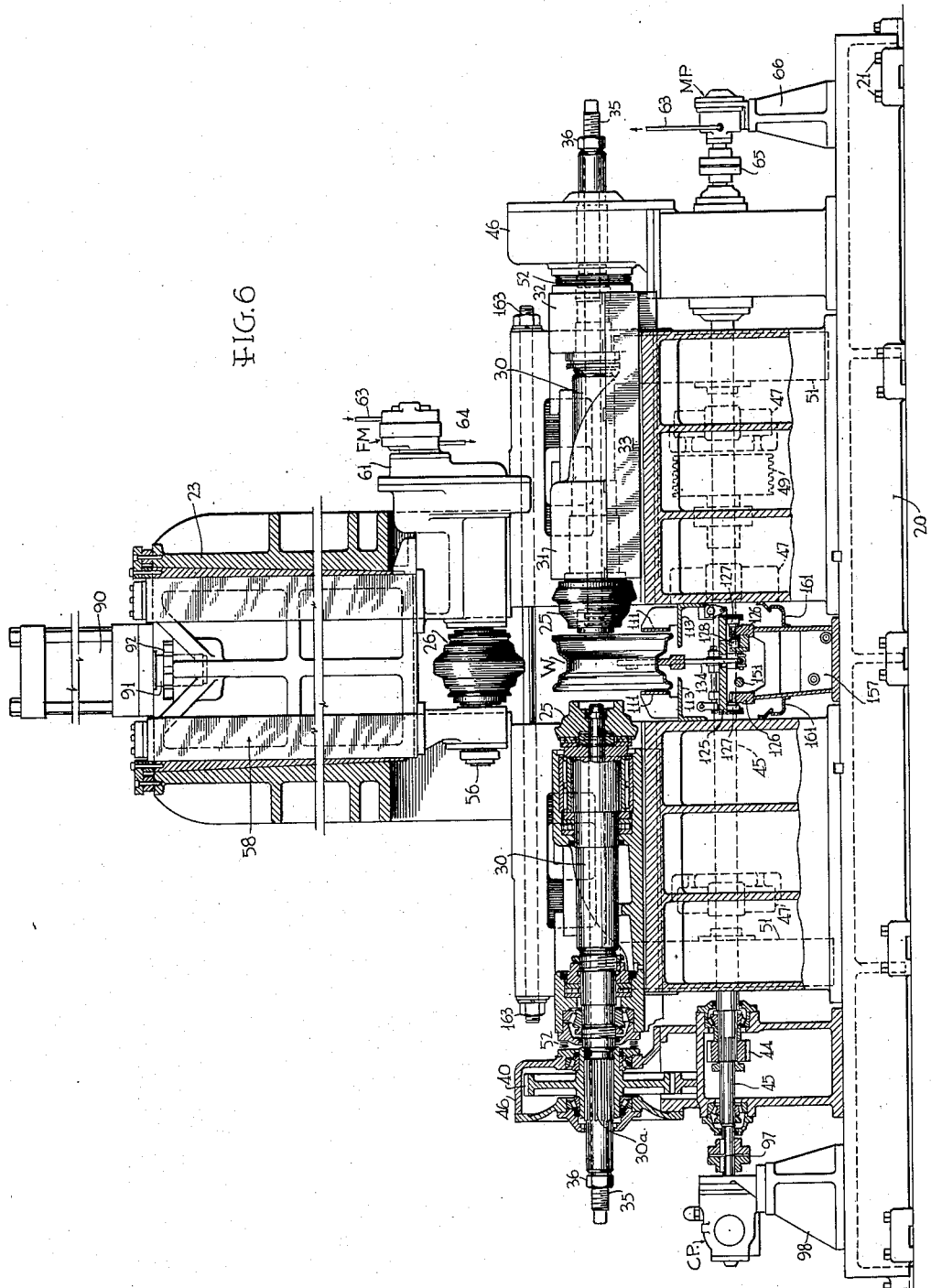
Fig. 6 is an axial vertical section similar to Fig. 5, but showing some parts in elevation and showing the rolls in a different position.

It is assumed that the gate 115 is in the back position, Fig. 7; that a rim blank W is in the gate, Fig. 7; that the carriage 125 is in the back or rearward position, as shown in Fig. 8 but with no rim thereon; that the bottom or end rolls 25 are in the back or retracted position, Fig. 6; and that the upper roll 26 and the guide rolls 27 are in the up or retracted position, Fig. 7.

The gate swings up, clockwise, Fig. 8, to discharge a rim blank upon the carriage.

A time delay is provided for the rim to be transferred from the gate to the carriage.

The gate returns to the back position, Fig. 7.

The carriage moves with the rim to its forward or advanced position, Fig. 7, where the rim blank W is in position for the lower rolls to enter it.

The lower rolls 25 move to advanced position within the rim, Fig. 5, and firmly interlock together.

The carriage returns to its back or retracted position, pulling the arm 134 and its roller 137 under the rim blank, the dashpot 145 allowing this movement of the arm and easing its return to raised position by its spring 142.

The upper roll 26 and guide rolls 27 move down.

It is understood that the working rolls, both upper and lower, rotate continuously, whether advanced or retracted or moving between these positions.

The movement of the upper roll is slowed and the pressure on it is increased near the end of its downward movement.

An adjustable time control regulates the length of time that the rolls act on the rim.

After the predetermined time delay, the upper and guide rolls move up to retracted position.

The lower rolls return to retracted position.

The finished rim drops down from between the retracted lower rolls and runs off to the rear along the inclined track rails 113 of the discharge chute 111.

The parts are now in position for the cycle to be repeated.

Means have been provided for controlling the operation of the machine and assuring that the various parts operate at the proper time without danger of injury. These controls include certain interlocks, limit switches, etc., which appear in some of the views so far considered, that is, Figs. 1 to 16; but it will be more convenient to discuss them in connection with the schematic view, Fig. 17, and the wiring diagram, Fig. 18, now to be explained.

In the following description reference will be made to both the schematic view, Fig. 17, and the wiring diagram, Fig. 18. The following abbreviations will be used:

LS designates a limit switch operated mechanically by some moving part of the machine.

HS designates a hand operated switch actuator which maintains its position after each actuation.

PB designates a hand operated switch actuator which returns to its original position when released by the removal of the operator's hand from it.

R designates a relay, more specifically the coil of the relay.

The letters A, B, C, etc., following a designated relay, such as R-1, R-2, R-3, etc., designate a switch which is operated by that relay.

The letter V refers to a fluid valve.

In the wiring diagram, ganged parts which are arranged to operate together are connected by dotted lines, as is common practice where they are close together; but where they are some distance apart, to avoid the confusion of long and crossing lines, the gang lines are discontinued between their ends and may be established by using a straight edge between the ends of the open lines and following the direction of the arrows.

Figure 17:
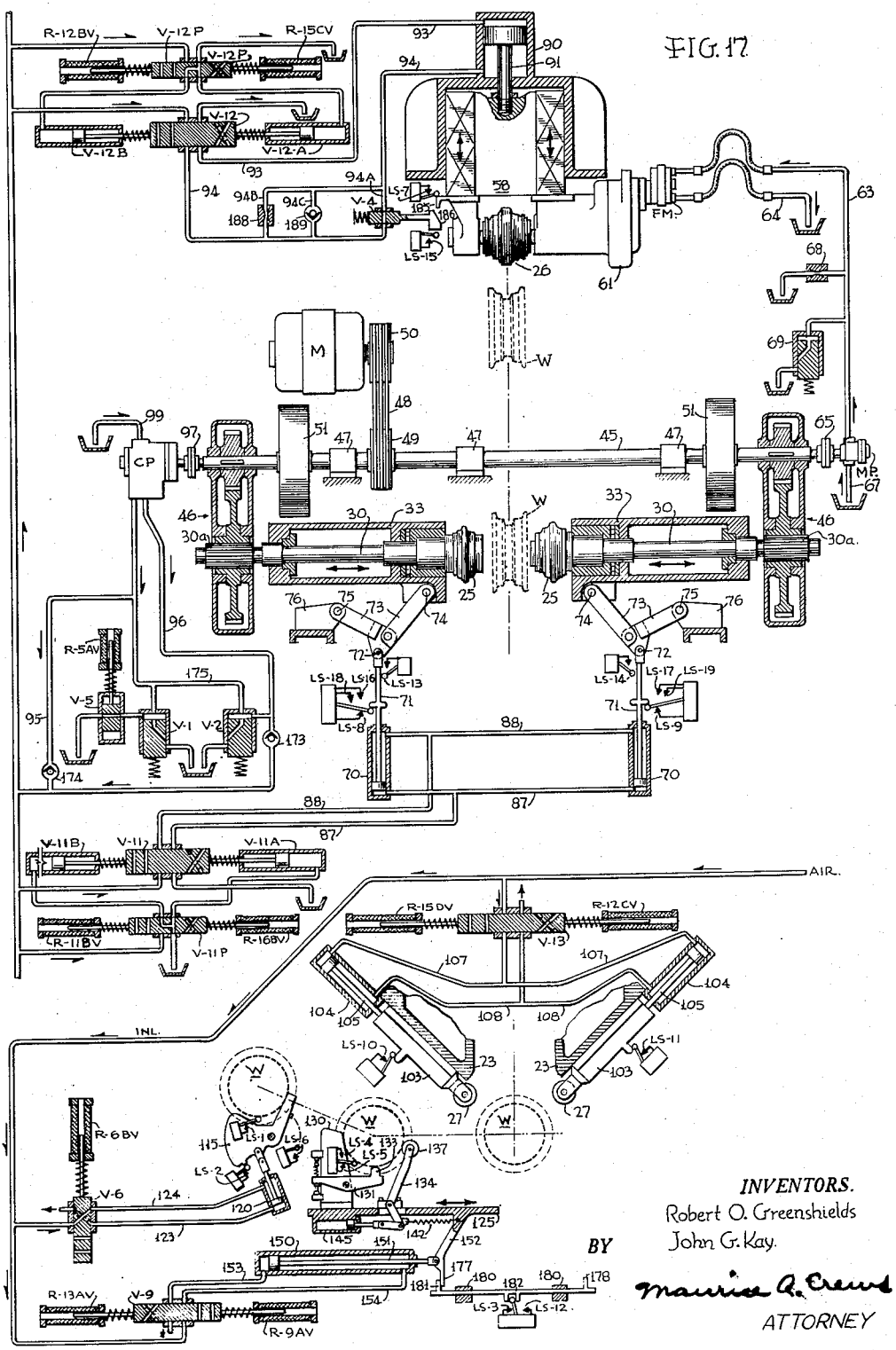
Fig. 17 is a schematic view.

First, a normal automatic cycle will be followed, and it will be understood that the parts are in the position referred to above for the start of the cycle, the parts being shown in this position in Fig. 17. It will be noted that some of the parts have been swung out of their normal planes in Fig. 17 for clarity of illustration of all parts in a single view.

At the start, the operator moves the control of the "Hand-Auto" switch selector HS-1, which is on the control panel, to "Auto" which closes switch HS-1A (automatic) and opens switch HS-1M (manual).

*Automatic operation selected*

It will be assumed that coolant-lubricant is desired for the rolling operations, so the control of the "Coolant-On-Off" selector HS-2 on the control panel is moved to close its single switch. This (when the machine is started) energizes relay coil R-2 to close its switch R-2A in a power circuit and energize a power solenoid R-2AS and close a switch S-2 which starts the motor PM of coolant pump P into operation as soon as the machine is started.

*Coolant pump readied to start*

To start the machine, the operator presses push button PB-1 on the control panel. This closes its switch and energizes relay R-1 to close its switch R-1A in the power circuit and energize a power solenoid R-1AS of the motor switch S-1 to start the main motor M.

*Main motor starts—Also coolant pump*

Energization of relay R-1 also closes its lock-in switch R-1B to keep it energized after PB-1 has been released.

To start the cycle, the operator presses push-button PB-2 on the control panel. This closes two switches which are ganged to operate together, PB-2A in the circuit of a cycle relay R-3, and a switch PB-2B in the circuit of a relay R-9 which causes the carriage 125 to advance toward the rolls if it already has a rim on it. However, this is a safetying operation, and it will be assumed for present purposes that a rim is not yet disposed on the carriage to cause it to move forward immediately.

Closure of PB-2A energizes relay R-3 to start the cycle. Energization of relay R-3 closes its three normally open switches R-3A, R-3B and R-3C.

*Cycle starts*

Closure of R-3A locks in relay R-3 to keep it energized after PB-2 is released to open PB-2A.

Closure of R-3B energizes a relay R-4 which is in circuit with several limit switches to assure that the cycle of operations does not proceed until certain parts are in desired position, more immediately, that there is a rim blank W in the gate ready to be fed upon the carriage.

The limit switches which are in circuit with relay R-4 are shown in Fig. 17 and include LS-1, which is closed when a rim blank W is in the notch of the gate, LS-2 which is closed when the gate is in its down or back position, LS-3 which is closed when the carriage is in its back or retracted position ready to receive a rim, and LS-4 which is open if there is a rim on the carriage; but which, as stated above, is here assumed to be closed.

Closure of R-3C energizes a relay R-5 which, when energized, closes its switch R-5A to energize a solenoid R-5AV which closes a venting valve V-5 (Fig. 17). Venting valve V-5, when closed, causes pressure to build up at a pressure relief valve V-1 in the high pressure line 95 from pump CP to supply liquid at high pressure to the cylinders 70 which advance the lower rolls 25 and the cylinder 90 which advances the upper roll 26.

It is necessary to keep the system full of liquid at all times, so, prior to the time that venting valve V-5 is closed, the low pressure line 96 from combination pump CP is supplying fluid past its low pressure relief valve V-2 and a check valve 173 to the system. Another check valve 174 in the high pressure line 95 prevents liquid from the low pressure line 96 from flowing back into the high pressure line 95 and escaping if the vent valve, when open, allows the pressure in line 95 to go too low. After valve V-5 closes, liquid from line 95 acts through a line 175 to open the low pressure relief valve V-2 to pass liquid to the sump. Check valve 173 prevents high pressure liquid from entering the low pressure line.

Energization of relay R-4 closes its switch R-4A and energizes gate-actuating relay R-6. The energization of R-6 depends upon the limit switches LS-3 (closed if carriage back) and LS-4 (closed if no blank on the carriage) being closed.

Energization of relay R-6 closes its switches R-6A, R-6B, and R-6C.

Closure of switch R-6A locks relay R-6 in circuit with a time delay switch R-8B which will be described presently.

Closure of switch R-6B energizes the solenoid R-6BV of a valve V-6 in the air supply line to the cylinder 120 to supply air under pressure to the lower or head end and open the upper or rod end to exhaust.

Closure of switch R-6C energizes a gate lockout relay R-7.

Energization of relay R-7 closes its switch R-7A to lock itself in past switch R-4A on the limit switches LS-3 (closed if carriage back) and LS-4 (closed if no rim in carriage).

It also opens its normally closed switch R-7B which is in circuit with relay R-4 to de-energize this relay and open switch R-4A.

Energization of solenoid R-6BV, as stated, places air under pressure in the head end of cylinder 120 and causes the piston rod to move up.

*Gate moves up.—Rim fed to carriage*

When the gate moves up, it causes a rim to roll off the gate and upon the carriage. The gate in starting to move up opened its back limit switch LS-2. At the forward end of its stroke it closed limit switch LS-6 which is in circuit with a feed time delay relay R-8. Removal of the rim from the gate opens limit switch LS-1; and deposit of the rim on the carriage when completed will open limit switch LS-4 and close limit switch LS-5. It is to be noted that LS-4 and LS-5 are interrelated or ganged so that one opens when the other closes and vice versa, this being indicated by the open arrow line in Fig. 18. One illustrative embodiment of this arrangement is shown in Fig. 17.

Opening of limit switches LS-1 (closed if rim in gate) and LS-2 (closed if gate back) merely opens the circuit of relay R-4 at other points, it having been seen that the circuit has already been opened by the opening of switch R-7B. Likewise the opening of limit switch LS-4 (closed if no rim on carriage) opens the make circuit of relay R-4 at another point.

Closure of limit switch LS-6 (closed if gate up) energizes feed time delay relay R-8.

Energization of time delay relay R-8 at once closes its own lock-in switch R-8A and starts the action for its delay switch R-8B to open and its delay switch R-8C to close.

*Time delay for rim to be fed to carriage*

Completion of the transfer of the rim to the carriage opens limit switch LS-4 and closes limit switch LS-5, as referred to above.

The opening of time delay switch R-8B de-energizes relay R-6 (gate up), as noted above.

The spring return, acting against R-6BV solenoid and its valve V-6, reverses the valve to feed air under pressure to the upper end of cylinder 120 and connect the lower end to exhaust. This causes the gate segment to move back and another rim rolls down into the gate to close LS-1.

*Gate moves back*

When the gate moves back, it opens LS-6 and closes LS-2.

The closure of time delay switch R-8C energizes relay R-9 which causes the carriage to move forward. It will be noted that relay R-9 has in its make circuit a number of limit switches for safety interlock. Limit switch LS-5, which closes when a rim is on the carriage, has already been noted. Limit switch LS-7 is closed when the upper roll 26 is up, back, or retracted. Limit switches LS-8 and LS-9 are closed when the lower rolls 25 are back or retracted. Limit switches LS-10 and LS-11 are closed when the guide rolls 27 are up, back, or retracted.

Energization of relay R-9 closes its switches R-9A and R-9B and opens R-9C.

Closure of switch R-9A energizes valve solenoid R-9AV to operate its valve V-9 to supply air under pressure to the head end of cylinder 150 and open the rod end to exhaust.

Closure of switch R-9B energizes a relay R-10 which assures that the lower rolls are fully forward or advanced and set up together ready for rolling operations. Opening of R-9C de-energizes the feed time delay relay R-8.

*Carriage advances to carry rim blank into rolling position*

Movement of the carriage to its forward position opens its back limit switch LS-3 and closes its forward limit switch LS-12. As shown in Fig. 17, the carriage 125 carries an actuating projection 177 which at the forward end of its travel strikes a projection 178 on a sliding bar 179 mounted in guides 180 to move the bar forward. At the rearward end of its travel, the carriage projection 177 strikes another projection 181 on the sliding bar to move it rearwardly. A notch or spaced elements 182 on the bar 179 cause operation of the switch arm to close LS–12 when LS–3 is opened at the end of the forward movement of the carriage and to close LS–3 when LS–12 is opened at the end of the back stroke of the carriage.

Closure of limit switch LS–12 (closed if carriage forward) energizes relay R–11 for causing the lower rolls to move forward. It will be noted that there are several limit switches in the make circuit of R–11 for safety. These are LS–7 (upper roll back), LS–8 and LS–9 (lower rolls back), and LS–10 and LS–11 (guide rolls back).

Energization of R–11 closes its switches R–11A and R–11B. Closure of R–11A locks this relay in past the limit switches LS–8 and LS–9 (closed if lower rolls back) so the lower rolls will continue to move after they move out of their back position and these switches open.

Closure of switch R–11B energizes the solenoid R–11BV of the pilot valve V–11P. This admits pressure fluid to the cylinder V–11A of the main valve V–11 and exhausts fluid from the opposite cylinder V–11B of the valve.

Lower rolls move up together

When the lower rolls move up together they enter a rim blank which is held in place on the carriage. Preferably they lift its bottom off the carriage in this movement. In leaving their back position, they open their back limit switches LS–8 and LS–9 and, when they reach the full forward end of their travel, they close their limit switches LS–13 and LS–14.

There are other limit switches LS–16, LS–17 in parallel with each other and with switch R–3C for vent valve relay R–5 which are ganged with limit switches LS–8 and LS–9, switches LS–16, LS–17 being open when the lower rolls are back and opening as the rolls start to advance.

The energization of relay R–10 (lower rolls set up), previously referred to, closes its switches R–10A, R–10B and R–10C.

Closure of switch R–10A locks in relay R–10 past switch R–9B.

Closure of switch R–10B energizes relay R–12 which causes the upper roll 26 and guide rolls 27 to move forward, that is, down into engagement with the rim. Limit switches LS–13 and LS–14 (closed if lower rolls forward) in the circuit of R–12 will be closed at this time.

Closure of switch R–10C energizes relay R–13 which causes the carriage to retract. Relay R–13 is in circuit with limit switches LS–13 and LS–14 (closed if lower rolls forward) so the carriage cannot be returned before the rim blank is supported on the lower rolls.

Carriage ready to return

Energization of relay R–12 closes its switches R–12A, R–12B, R–12C and R–12D and opens its normally closed switch R–12E. Closure of R–12A locks in R–12 with R–14B.

Closure of switch R–12B energizes the solenoid R–12BV of a pilot valve V–12P to admit liquid under pressure to operating cylinder V–12A of valve V–12 and to open the other cylinder V–12B to exhaust and thus to admit pressure liquid to the head end of cylinder 90 and to open the rod end to exhaust.

Upper roll moves down

Near the lower end of the downward travel of the upper roll, a cam operating element 185 carried by the slide 58 engages the cam 186 of a cut-off valve V–4, causing the valve to close a branch line 94A in the pipe line 94 to the rod end of cylinder 90. This causes the liquid in escaping from the rod end by way of pipe line 94 to flow past a restricting valve 188 in a branch line 94B to slow down the descent of the upper roll and to cause pressure to build up in the head end of the cylinder 90 for forcing the upper roll down upon the rim blank. An upwardly opening check valve 189 in a branch line 94C permits rapid flow of fluid to the rod end of the cylinder in raising the upper roll before valve V–4 opens.

When the upper roll starts down it opens its limit switch LS–7 and when it reaches the end of its downward travel it closes a limit switch LS–15. Switch LS–7 is in a circuit which has already been opened; switch LS–15 is in a circuit to a relay R–15 which causes the upper rolls to return to upper position, as will be described presently.

Closure of switch R–12C energizes the solenoid R–12CV of a valve V–13 to admit air under pressure to the head end of the cylinders 104 of the guide rolls 27 and to open the rod end of the cylinders to exhaust.

Guide rolls move down

When the guide rolls start to move down, they open their limit switches LS–10 and LS–11 already noted.

Closure of switch R–12D energizes a rolling time relay R–14 which assures that the rolling operation will continue for a predetermined time, which may be adjusted as desired.

Opening of normally closed switch R–12E, which is in the make circuit of relay R–15, prevents energization of this relay until the desired time.

Digression will be made here to revert to the return of the carriage which was initiated after the rim blank was in position on the closed-up lower rolls when relay R–13 was energized by the closure of switch R–10C.

Energization of relay R–13 closes its switch R–13A to energize the solenoid R–13AV of valve V–9 to admit air under pressure to the rod end of cylinder 150 and to open the head end to exhaust.

Carriage returns to back position

At the end of its return stroke the carriage 125 closes its back limit switch LS–3 and opens its forward limit switch LS–12. This produces no immediate action, merely readying the circuit for future action, and the carriage remains in its back position. It has already been noted how the arm 134 is pulled under the rim in passing and how it rises again to rim-receiving position as the carriage moves to its back position.

Energization of rolling time delay relay R–14 closes its switch R–14A at once and after a time interval opens its delay switch R–14B and closes its delay switch R–14C.

Closure of switch R–14A, which is in circuit with a normally closed switch R–15E, locks in relay R–14.

Opening of time delay switch R–14B de-energizes relay R–12 which caused the upper rolls to move down.

Closure of time delay switch R-14C, which is in circuit with limit switch LS-15 (closed when upper roll moves out of upper or back position) and switch R-12E which re-closed when R-12 was de-energized, energizes relay R-15 which causes the upper rolls (26 and 27) to return.

Energization of relay R-15 closes its switches R-15A, R-15B, R-15C, and R-15D and opens its normally closed switch R-15E.

Closure of switch R-15A locks in relay R-15 past time delay switch R-14C.

Closure of switch R-15B closes the circuit to a relay R-16 which causes the lower rolls 25 to return to their back or retracted position.

Closure of switch R-15C energizes the solenoid R-15CV of pilot valve V-12P of valve V-12 which admits pressure fluid to the rod end of cylinder 90 and opens the head end to exhaust and causes the upper roll to return to its back position.

*Upper roll returns to its back position*

In returning to its back position, the upper roll guide opens limit switch LS-15 and closes limit switch LS-7.

Closure of switch R-15D energizes the solenoid R-15DV of valve V-13 to admit pressure fluid to the lower or rod end of cylinders 104 of the guide rolls 27 and to open the upper end to exhaust, causing the guide rolls to retract.

*Guide rolls move to back position*

When the guide rolls 27 move away from their forward position, their limit switches LS-10 and LS-11 are closed.

Opening of switch R-15E de-energizes rolling time delay relay R-14.

Energization of relay R-16 closes its switches R-16A and R-16B.

Closure of switch R-16A, in a circuit with limit switches LS-18, LS-19 which open when the lower rolls are in back position, locks in relay R-16 past the limit switches LS-13 and LS-14 (closed if lower rolls forward) and R-15B so the relay will remain energized as the lower rolls return to their back position.

Closure of switch R-16B energizes the solenoid R-16BV of valve V-11P to actuate valve V-11 to supply pressure fluid to the rod end of cylinders 70 and to open the head end to exhaust to cause the lower rolls to retract.

*Lower rolls move to their back position*

When the lower rolls move to their back position, they open limit switches LS-13 and LS-14 and later close limit switches LS-8 and LS-9 and open limit switches LS-16 and LS-17. They also open limit switches LS-18 and LS-19 in the back position. Opening of the limit switches LS-18 and LS-19, which are in the lock circuit with the lock-in switch R-16A of relay R-16, causes this relay to be de-energized after the lower rolls are fully back in their retracted position but not before.

The purpose of using limit switches LS-16 and LS-17, which are open when the lower rolls are in back position but which close when the rolls move out of back position, is to provide that the vent valve controlling relay R-5 will be actuated to close the venting valve V-5 whenever either of the lower rolls is moved out of its back position. Normally, during the automatic cycle, the switch R-3C of the cycle relay R-3, which is kept energized for cycle repetition, will keep the circuit to the venting control relay closed, so that the cut-off valve V-5 is closed at all times without regard to the position of the lower rolls; but the limit switches LS-16 and LS-17, which are in lines paralleling that of switch R-3C, are of use when the automatic cycle is not being used.

*Manual operation*

It may be desirable, at times, to operate the machine manually, as for example, in testing out adjustments for new parts, for different stock sizes, and the like. For the purpose of providing such manual operation, appropriate controls are supplied, as shown in Figs. 18 and 19.

The hand control HS-1 is turned to "Hand" to close switch HS-1M and open HS-1A.

The start push button PB-1 is pressed to start the main motor M. Also it will be assumed that the coolant motor is operating, if desired.

Closure of switch HS-1M energizes relay R-20. It remains energized so long as switch HS-1M is closed.

Energization of R-20 closes its switch R-20A for R-4 (rim in gate), opens its switch R-20B for R-10 (lower roll set-up), closes switch R-20C of R-11 (lower rolls forward), closes switch R-20D for R-12 (upper and guide rolls down), closes R-20E for R-16 (lower rolls return) and opens R20F (for R-16 in circuit with R-15B). Actuation of none of these switches produces any immediate effect, merely preparing for manual operation.

The operator now presses the index push button PB-3. This energizes R-4 (rim in gate). It is assumed that all parts are in proper position and that limit switches LS-4, LS-3, LS-2 and LS-1 are closed.

Energization of R-4 closes its switch R-4A to energize relay R-6 which causes the gate to move up and transfer a rim to the carriage.

Relay R-6 locks in on R-6A. When the gate is up it closes LS-6 in the circuit of R-8 (feed time delay). Energization of R-8, after a time delay opens R-8B to deenergize R-6 and cause the gate to return to back position.

After a time delay, R-8 also closes R-8C to energize R-9 to cause the carriage to move forward. After a time R-8C is opened, the gate having returned to open LS-6 and de-energize R-8.

When either lower roll moves out of back position, it closes one of the limit switches LS-16 or LS-17 to energize R-5 to close the venting valve V-5 and raise the pressure of fluid for the roll cylinders.

In its forward position, the carriage closes LS-12 to energize R-11 to cause the lower rolls to move forward.

A push button PB-4 is provided for energizing R-11 to move the lower rolls forward without regard to the position of other parts. This is useful for try-out operations to test adjustments and the like.

Relay R-11 locks in on R-11A to complete the forward movement of the lower rolls.

The operator presses push button PB-5 to energize R-12 and cause the upper and guide rolls to move down. R-12 locks in on R-12A, in circuit with time delay switch R-14B; and also closes R-12D to energize the rolling time delay relay R-14.

After a time delay for rolling, relay R-14 closes switch R-14C to energize R-15 (relay R-14 having in the meantime opened R-14B to de-energize R-12 to re-close R12E which it had opened), which causes the upper and guide rolls to return.

The operator presses push button PB-6 to energize R-16 to cause the lower rolls to return.

The operator presses push button PB-7 to energize R-13 to cause the carriage to return.

Emergency controls

Certain controls are provided for emergency use.

A main "stop" push button PB-8 will de-energize relays R-1 and R-2 to stop the operation of the main motor M and the coolant pump motor PM.

A "cycle stop" push button PB-9 has ganged switches PB-9A and PB-9B which, when opened, respectively, de-energize cycle relay R-3 and feed time delay relay R-8.

An "emergency return" push button PB-10 has ganged switches PB-10A, PB-10B and PB-10C. Switches PB-10A and PB-10B when opened, respectively, de-energize cycle relay R-3 and the relay R-12 for causing the upper and guide rolls to move down. Switch PB-10C (normally open), when closed, energizes relay R-15 to cause the upper and guide rolls to retract.

It is thus seen that the invention provides a machine in which the rolls separate to receive stock and which are fully closed to form a very strong and rigid assembly before the rolling commences, whereby very accurate sizing is accomplished. Also it provides improved stock handling means and movement controlling means which furnish maximum speed of operation with greatest safety.

While one embodiment has been disclosed for purposes of illustration, it will be understood that there may be other embodiments within the general scope of the invention.

What is claimed is:

1. Apparatus for shaping annular parts, such as drop-center wheel rims, comprising in combination, axially movable end rolls for operating upon the inner circumference of the part, means for moving the end rolls axially to permit annular parts to be fed in and removed, said moving means causing the axially movable end rolls to be brought fully together before the roll working action starts, a lateral roll for operating on the outer circumference of the part in cooperation with the axially movable inner rolls, means for moving the lateral roll toward and from the axially movable inner rolls, and means controlled by the position of the axially movable inner rolls for causing said lateral roll to move toward said axially movable inner rolls when and only after said inner rolls have been brought fully together.

2. Apparatus for shaping annular parts, such as drop-center wheel rims, comprising in combination, a pair of axially movable end-telescoping end rolls for operating upon the inner circumference of the part, means for moving the end rolls axially to permit annular parts to be fed in and removed, said moving means including toggle links which move to dead-center position to force the end rolls fully together before the roll working action starts, a laterally movable side roll for operating on the outer circumference of the part in cooperation with the inner rolls, and means for moving the side roll toward and from the end rolls.

3. Apparatus as set forth in claim 2, which further comprises, means for adjusting the position of the toggle links to vary the stopping position of the axially movable end rolls.

4. Apparatus as set forth in claim 2, further characterized by the fact that said end rolls are mounted upon axially movable slides and that a normally fixed anchor slide which is adjustable axially is provided adjacent each roll slide, the toggle links being pivoted at their ends to said roll slides and adjustable pivot slides, and power operating means for the toggle links for each roll pivotally connected to the intermediate joint of the toggle links.

5. Apparatus for shaping annular parts, such as drop-center wheel rims, comprising in combination, axially movable end rolls for operating upon the inner circumference of the part, power means for moving the end rolls axially to permit parts to be fed in and removed, said moving means causing the end rolls to be brought fully together and locked in position before the roll working action starts, a laterally movable side roll for operating on the outer circumference of the part, power means for forcing the side roll upon the part on the end rolls, guide rolls disposed circumferentially on each side of the side roll, and power means for moving said guide rolls against the part to hold it during the rolling action.

6. Apparatus for shaping annular parts, comprising in combination, axially separable end-interfitting end rolls for operating upon the inner circumference of the part, a side roll movable radially toward and from the end rolls, power means for moving the end rolls together and apart, power means for moving the side roll radially toward and from the end rolls, and means for initiating the inward movement of the side roll toward the end rolls when the end rolls have been brought fully together and preventing the inward movement of the side roll until after the end rolls have been brought fully together.

7. Apparatus for shaping annular parts, comprising in combination, axially separable end-interfitting end rolls for operating upon the inner circumference of the part, a side roll movable radially toward and from the end rolls, guide rolls movable radially toward and from the end rolls, power means for moving said rolls, and means coordinating said power means to cause said side and guide rolls to move toward the end rolls after, and only after the end rolls have been brought fully together.

8. Apparatus for shaping annular parts, comprising in combination, axially separable end rolls, a radially movable side roll mounted to be brought against a part on the end rolls to roll it thereagainst, power means for moving said end rolls axially and the side roll radially, power means for rotating said end rolls at the same speed, and yieldable power means for rotating said side roll to apply power to it but permitting it to assume the turning speed required by the turning of the end rolls said power means for rotating the side roll comprising a motor such as a fluid actuated motor having slip so as to continue applying driving power while still permitting the side roll to turn at the same speed as the end rolls.

9. Apparatus as set forth in claim 8, further characterized by the fact that the power means for rotating the side roll comprises a fluid actuated motor mounted to move radially with the roll.

10. Apparatus for shaping annular parts, such as drop-center wheel rims, comprising in combination, axially separable end rolls and a radially separable side roll for rolling the parts, gate means for feeding parts one at a time, a positioning device for presenting parts between the rolls when separated, control means providing operation of said gate means for releasing a part to said positioning means when it is empty, and control means providing operation of said positioning means for presenting a part between the rolls only when they are in separated position.

11. Apparatus for shaping annular parts, such as drop-center wheel rims, comprising in combination, axially separable end rolls and a radially separable side roll for rolling a part between them, means for feeding parts to the rolls when they are separated, and control means for coordinating the action of said feeding means and said rolls, said control means causing operation of said feeding means to feed a part when the rolls are in separated position and preventing operation of the feeding means when the rolls are out of separated position, for causing operation of the rolls to bring them together when the feeding means has placed a part between the end rolls, and for causing the side roll to converge on the work after, and only after, the end rolls have been brought fully together.

12. Apparatus for shaping annular parts, such as drop-center wheel rims, comprising in combination, axially separable end rolls and a radially separable side roll for rolling a part between them, power means for separately moving each of said rolls between retracted and advanced positions, means for feeding parts to present them singly between the end rolls when they are retracted, gate means for presenting parts one at a time to said feeding means, and control means for coordinating the action of said rolls, said feeding means and said gate means, said control means holding said gate and feeding means against operation to present a part when the rolls are out of fully retracted position and for causing their actuation when the rolls are in their retracted position, for causing the advance of said end rolls when a part is presented between them, and for causing the advance of said side roll after, and only after, the end rolls have been advanced to bring them together.

13. Apparatus for shaping annular parts, such as drop center wheel rims, comprising in combination, axially separable end rolls and a radially separable side roll for rolling a part between them, power means for separately moving said end rolls and said side roll between retracted and advanced positions, feeding means for presenting parts one at a time between the end rolls when retracted, gate means for presenting parts one at a time to said feeding means, and control means for coordinating the action of said rolls, said feeding means and said gate means, said control means including coordinating parts which cause operation of said gate means when, and only when, the feeding means is in article-receiving position, which cause article-feeding action of said feeding means when, and only when, all of the rolls are in retracted position, which cause the end rolls to advance to fully closed position when a part is presented by the feeding means between the end rolls in separated position, and which cause the side roll to be advanced against the part on the end rolls when, and only when, the end rolls are in fully-closed advanced position.

References Cited in the file of this patent
UNITED STATES PATENTS

| Number | Name | Date |
| --- | --- | --- |
| 1,428,778 | Grotnes | Sept. 12, 1922 |
| 1,939,577 | Sneed | Dec. 12, 1933 |
| 2,154,004 | Le Jeune | Apr. 11, 1939 |
| 2,195,398 | Duda | Apr. 2, 1940 |